United States Patent
Connors, Jr.

(10) Patent No.: US 7,828,973 B2
(45) Date of Patent: Nov. 9, 2010

(54) PLASTIC ENCAPSULATED TANGENTIAL FLOW FILTER DEVICE AND METHODS FOR MAKING SAME

(75) Inventor: John F. Connors, Jr., Shrewsbury, MA (US)

(73) Assignee: Tangenx Technology Corporation, Shrewsbury, MA (US)

( * ) Notice: Subject to any disclaimer, the term of this patent is extended or adjusted under 35 U.S.C. 154(b) by 167 days.

(21) Appl. No.: 11/010,804

(22) Filed: Dec. 13, 2004

(65) Prior Publication Data

US 2005/0126981 A1 Jun. 16, 2005

Related U.S. Application Data

(60) Provisional application No. 60/529,422, filed on Dec. 12, 2003.

(51) Int. Cl.
  *B01D 63/00* (2006.01)
  *B01D 33/00* (2006.01)
  *B27N 3/08* (2006.01)

(52) U.S. Cl. ............ 210/321.75; 210/331; 210/321.84; 264/239; 264/241

(58) Field of Classification Search ............ 210/321.75, 210/321.6, 321.84, 331, 651, 456, 486, 340, 210/346, 321.64; 96/4; 264/239, 241
See application file for complete search history.

(56) References Cited

U.S. PATENT DOCUMENTS

| | | | |
|---|---|---|---|
| 4,025,425 A | | 5/1977 | Croonpnick et al. |
| 4,205,424 A | * | 6/1980 | Nagao et al. ............... 29/407.1 |
| 5,225,080 A | * | 7/1993 | Karbachsch et al. ... 210/321.75 |
| 5,599,447 A | * | 2/1997 | Pearl et al. ............. 210/321.75 |
| 5,922,200 A | * | 7/1999 | Pearl et al. ............. 210/321.75 |
| 6,030,539 A | * | 2/2000 | Zuk, Jr. ...................... 210/767 |
| 6,524,513 B1 | * | 2/2003 | Pearl et al. .................... 264/263 |
| 7,094,346 B2 | * | 8/2006 | Osenar et al. .......... 210/321.75 |
| 7,097,800 B2 | * | 8/2006 | Vigna et al. ................. 264/234 |

* cited by examiner

*Primary Examiner*—Ana M Fortuna
(74) *Attorney, Agent, or Firm*—Millen, White, Zelano & Branigan, P.C.

(57) ABSTRACT

Filtration devices that include filtration cassettes that feature a plurality of stacked subassemblies, wherein at least one of the subassemblies includes a porous membrane having a front side and a back side and a perimeter; and an overmolded frame that encapsulates the membrane around the perimeter of the front side and the back side of the membrane; wherein the overmolded frame forms at least one retentate port, at least one feed port, at least one filtrate port, and a flow channel proximate a perimeter of the frame; and an overmolded plastic jacket that penetrates the flow channels of the subassemblies to seal the stacked subassemblies; and methods for making the filtration device and cassettes.

25 Claims, 14 Drawing Sheets

(SIDE VIEW)

PLASTIC ENCAPSULATED TANGENTIAL FLOW FILTER DEVICE AND METHODS FOR MAKING SAME

CROSS-REFERENCE

This is a continuation-in-part of U.S. Application Ser. No. 60/529,422, filed on Dec. 12, 2003.

FIELD OF THE INVENTION

This invention relates to filtration devices and more specifically to tangential flow filter cassettes, and methods for making these cassettes.

BACKGROUND OF THE INVENTION

Tangential or cross-flow filtration cassettes are generally known in the art and are typically used to filter materials in a variety of industries including biotechnology and the food and beverage industries. Filtration cassettes are stacked assemblies made up of a plurality of layers comprising filtrate and retentate flow screens and intermediary porous membranes. These layers are stacked and compressed between top and bottom frame elements. A suspension fluid is introduced into a cassette through one or more portals, which then flows across a porous member whereby the some of the material, the filtrate, seeps downward through the member and the remaining material, the retentate, flows into and out of that layer of the cassette through a portal typically on the opposite side of the porous member layer. The filtrate that passes through the porous membrane flows out or is drained through a filtrate port. A cassette typically contains several layers which must each be fluid sealed from their respective adjacent layers. Currently, this seal is achieved through a variety of time consuming processes and with less then optimal materials.

There are several problems associated with these current materials and methods. Most of these methods involve a multi-step process that is time consuming and costly. For example, a typical multi-step process involves sealing the unused ports in a given individual layer while binding the membrane to the flow screens. This step includes arranging the flow screens and membrane into a fixture and then introducing the sealing materials under a vacuum. Next, the subassemblies are manually stacked within a frame or mold and a resin is then introduced around the outside surfaces of the stacked assembly, again under a vacuum. The entire assembly is then compressed between end plates to seal all the components together.

Other methods, although somewhat improved in terms of their cost and the efficiency of manufacture, do not provide a sufficient seal between the layers or degrade overtime.

For example, multi-component resin systems generally leach the constituents of the systems. Two-part resin systems are inherently unclean because their constituent parts do not completely or uniformly mix together. The unmixed constituents of the resin systems therefore leach over time from the cured encapsulant. These leachables are troublesome to the end user because the fluid stream typically comprises expensive drug products that require ultra clean conditions.

The current technologies are generally labor intensive to manufacture and therefore more expensive. Given the high cost of current devices, these current devices are usually reused, which compounds the problems caused by their inherently unclean characteristics. Multi-use products generally lead to cross-contamination because the devices are difficult to clean and, even when cleaned, the cleaning attempts inevitably leave behind contaminants causing subsequent cross-contamination between runs.

SUMMARY OF THE INVENTION

It is therefore a primary object of this invention to provide an improved filtration device that is molded using a single sealing component that does not leach.

It is a further object of this invention to provide a cost-efficient method for manufacturing an improved filtration device.

It is a further object of this invention to provide a filtration device that is disposable after a single use.

It is a further object of this invention to provide a filtration device that is appropriate for use in a wide variety of industries including biotechnology, pharmaceutical, chemical, biomedical, life sciences, food and beverages, petroleum, and fuel cell production.

A preferred embodiment of the filtration cassette of the invention generally comprises: a plurality of stacked subassemblies, wherein at least one of the subassemblies comprises, a porous membrane having a front side and a back side and a perimeter; and an overmolded frame that encapsulates the membrane around the perimeter of the front side and the back side of the membrane; wherein the overmolded frame has at least one retentate port, at least one feed port, at least one filtrate port, and a flow channel proximate a perimeter of the frame; and an overmolded jacket that penetrates the flow channels of the subassemblies to seal the stacked subassemblies. The overmolded frame may further comprise at least one stacking member, wherein at least one of the stacking members comprises an opening through the frame and at least one of the stacking members comprises a detent. The stacked subassemblies have a top subassembly with an upper surface against which a cover plate is preferably provided. The jacket further comprises a stacking notch. Both the frame and the jacket preferably comprise a similar material such as polypropylene.

The subassemblies are stacked adjacent to each other so that the retentate port and filtrate port of each subassembly connects to the retentate port and filtrate port, respectively, of an adjacent subassembly, to form at least one retentate conduit and one filtrate conduit through the stacked subassemblies. The cassettes preferably further comprise one or more screens between two or more of the subassemblies to create backpressure.

The preferred method of the invention for making a filtration cassette, generally comprises the steps of, providing a porous membrane having a front side and a back side and a perimeter; framing the membrane by molding one or more plastic materials around the perimeter of the front side and the back side of the membrane, thereby forming at least one retentate port, at least one feed port, at least one filtrate port, a flow channel proximate a perimeter of the frame, and one or more means for stacking; stacking a plurality of the framed membranes, adjacent to one another, so that the retentate ports and the filtrate ports of each frame members line up, respectively to an adjacent framed member, to form a retentate conduit and a filtrate conduit through the stack of framed members; and molding a plastic jacket around the stack of framed members so that the jacket penetrates the flow channels of the subassemblies to seal the stacked subassemblies. The stacking step preferably further comprises stacking one or more screens between two or more of the subassemblies.

A preferred embodiment of the filtration device of the invention generally comprises: a plurality of stacked filtration cassettes comprising, a plurality of stacked subassemblies, wherein at least one of the subassemblies comprises, a porous membrane having a front side and a back side and a perimeter; and an overmolded frame that encapsulates the membrane around the perimeter of the front side and the back side of the membrane; wherein the overmolded frame has at least one retentate port, at least one feed port, at least one filtrate port, and a flow channel proximate a perimeter of the frame; and an overmolded jacket that penetrates the flow channels of the subassemblies to seal the stacked subassemblies; and a cassette housing comprising, a first pressure plate on the top of the stacked cassettes; a second pressure plate on the bottom of the stacked cassettes; a gasket between each of the pressure plates and their respective adjacent cassette; and a means for securing the stacked cassettes between the pressure plates; and a means for compressing plates and cassettes together.

The plates preferably each have at least two bores through the plates and the means for securing comprises two dowels, each extending between the plates and through a bore in each of the plates and having threads a first end of the dowel and a stop member on the second end of the dowel, and wherein the means for compressing comprises a correspondingly threaded end cap tightened down onto the threaded first end of the dowel. The means for securing still further preferably comprises a vertical groove, corresponding to each of the dowels, provided in the jacket of the cassettes that, when the cassettes are stacked, line up with the groove on each adjacent cassette to form a combined groove into which at least a portion of the dowels is seated.

There are numerous advantages to the filtration device and methods of the invention. As noted, the device of the invention is molded using only a single type of molding material. This design solves the problem associated with prior multi-component resin systems that leach the constituents of the systems. In contrast, the device and methods of the invention use single component plastics that are inherently clean and are readily accepted by the medical, biotech, and life sciences industries for use in clean and sterile applications.

Yet another advantage of the devices and methods is the low costs associated with manufacturing the devices. These low cost methods enable the manufacturer to price and supply the devices as a single-use disposable. Priced as disposables, the user no longer needs to clean and reuse the cassette thus preventing cross-contamination among runs.

BRIEF DESCRIPTION OF THE DRAWINGS

Other objects, features and advantages will occur to those skilled in the art from the following description of the preferred embodiments and the accompanying drawings in which.

DETAILED DESCRIPTION OF THE PREFERRED EMBODIMENTS AND METHODS

The invention features a filtration cassette that is designed for use in a variety of application including: disposable tangential flow filter modules for use with reverse osmosis, nano-filtration, ultra-filtration and micro-filtration membranes; reusable tangential flow filter modules with reverse osmosis, nanofiltration, ultra-filtration and micro-filtration membranes; proton exchange membrane fuel cells; dialyzing osmosis devices, whereby two fluids are pumped through the device where a membrane separates the two fluid streams exchange occurs through a semi-permeable membrane; and heat exchangers that are similar to the dialyzing device except that heat is transferred across a membrane of heat exchanging film. The cassettes and methods of the invention may be adapted for small or large-scale processes.

The methods of the invention can be used to encapsulate any sheet material where it is desirable to have fluid or gas flow across the sheet, whether it permeates through the sheet or not. Specific applications include: utilizes injection-moldable plastic as the membrane encapsulant, instead of two-part mixed resin adhesives or urethane or silicone as an encapsulant. Unlike the current technology that utilizes two-part curing adhesives to form the seals, flow channels and structure around the membrane, the cassette and methods of the invention utilize injection molded plastics.

Figure 1:
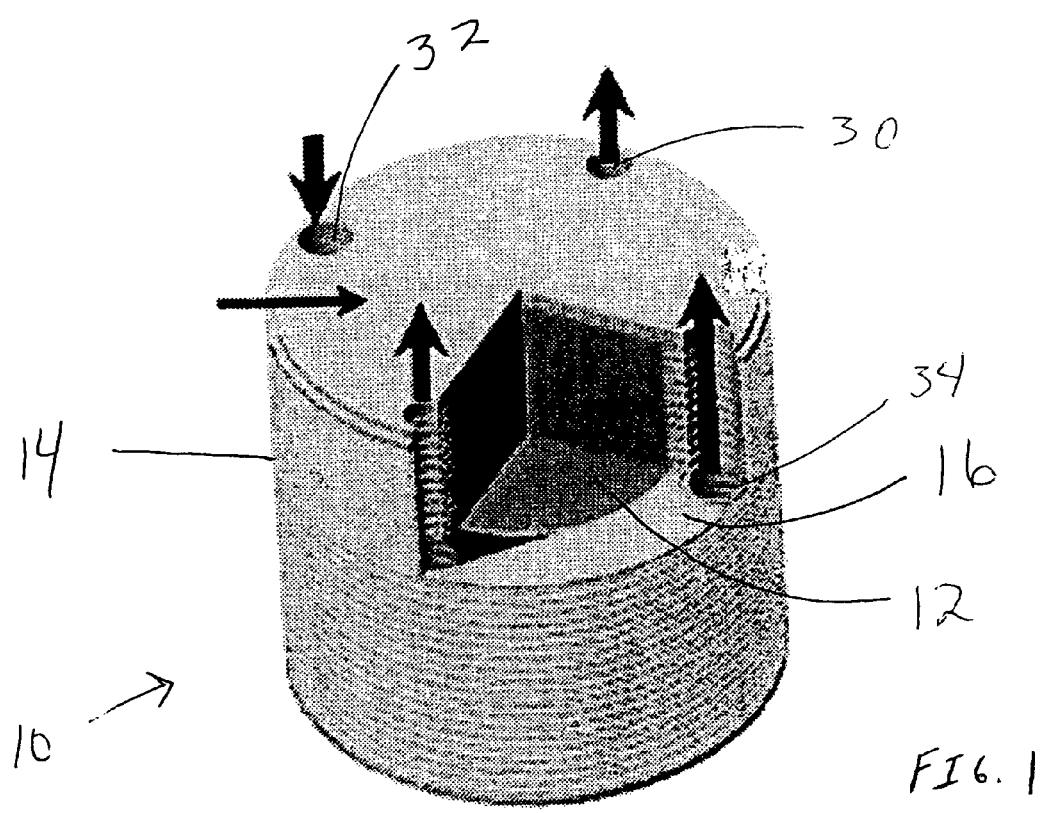
FIG. 1 is a perspective, cut-away view of a preferred embodiment of the filtration cassette of the invention.
Figure 2:
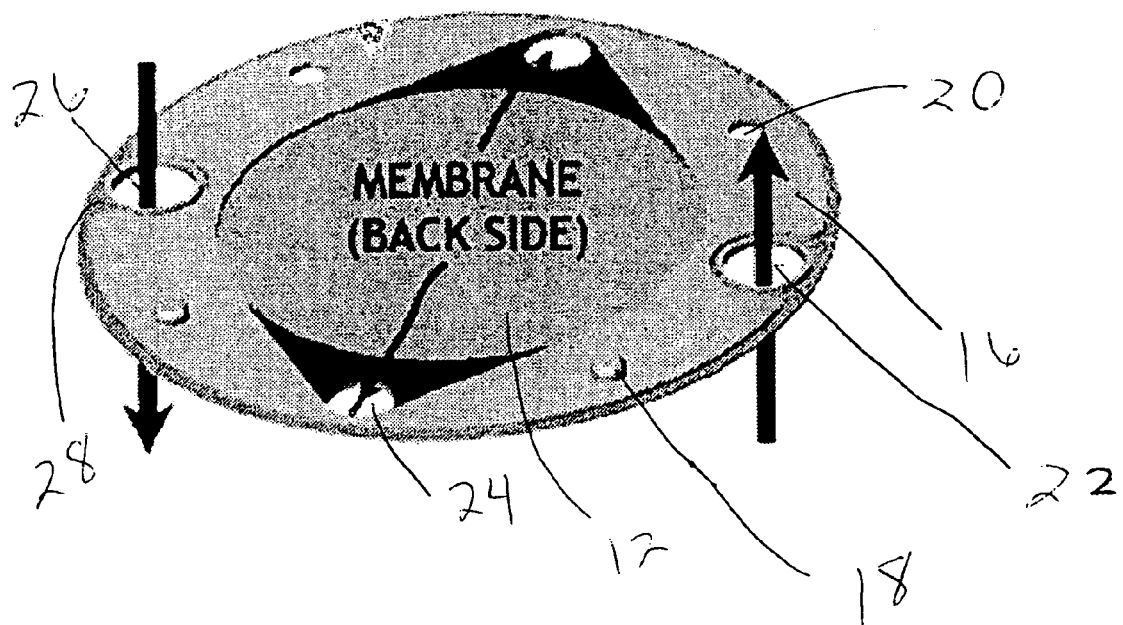
FIG. 2 is a perspective, schematic view of the membrane overmold frame of the preferred embodiment of the invention shown from the filtrate side.
Figure 3:
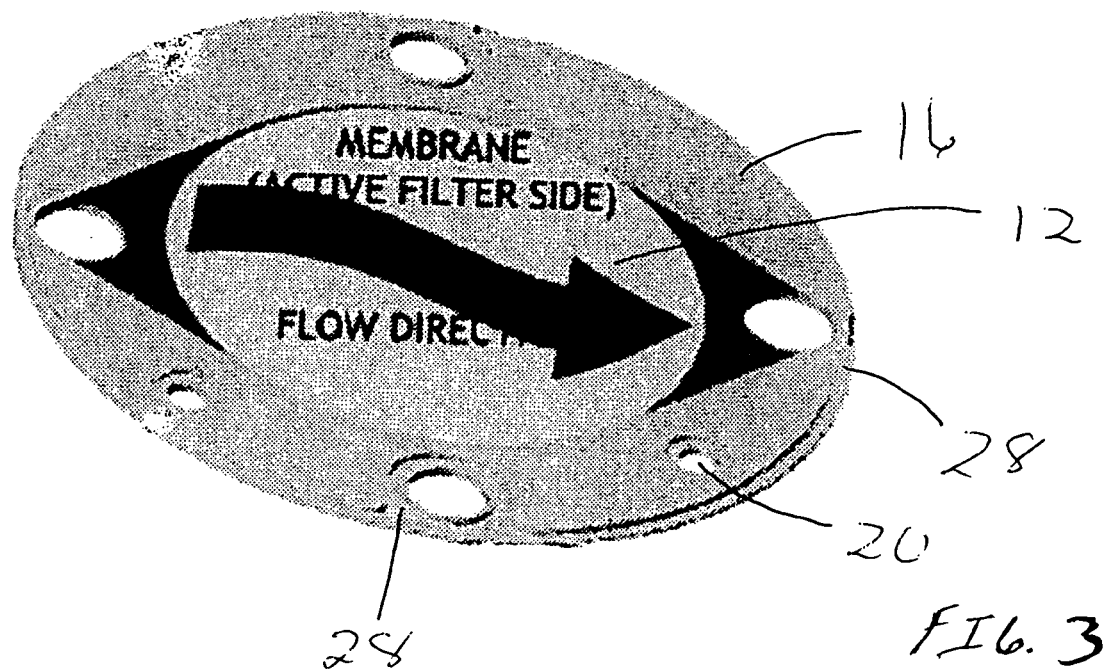
FIG. 3 is a perspective, schematic view of the membrane overmold frame of the preferred embodiment of the invention shown from the feed/retentate side.
Figure 6:
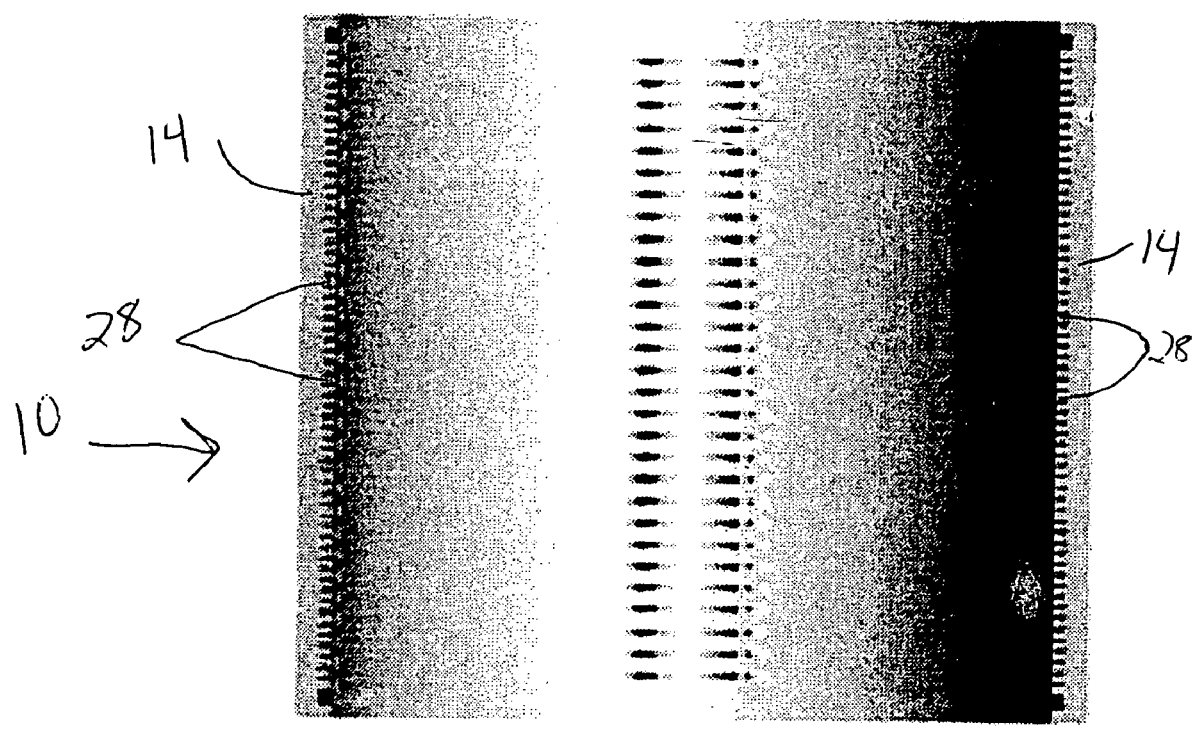
FIG. 6 is a is a side view of the preferred embodiment of the cassette of the invention complete with the overmolded edge.

The preferred embodiment of the filtration cassette of the invention is shown and generally referred to in FIG. 1 as cassette 10. Cassette 10 preferably comprises a plastic molded jacket 14 that is over-molded around a plurality of framed membranes 12. Membrane 12 is encapsulated and framed by molding a plastic material, preferably polypropylene, around the perimeter of membrane 12 to form retentate port 26, filtrate port 24, feed port 22, the stacking members, bores 20 and detents 18, and channels 28A and 28B. A molding tool or pressure is preferably used to injection mold the plastic material around the membrane. As shown in FIGS. 2 and 3, plastic frame 16 encapsulates the membrane at its perimeter and creates flow channels 28 into which plastic jacket 14 is molded in a subsequent step to bind the cassette stack together as a unit as shown in FIG. 6. The framed membranes are stacked one on top of another to form cassette 10. When stacked, these framed membranes form the feed/retentate and filtrate fluid flow channels or conduits 32, 34, and 30.

A tangential flow cassette works in the following manner. The process fluid is pumped through the feed/retentate port into one of many membrane channels and forced through the membrane into the filtrate channel. The membrane creates a barrier whereby only particles smaller than the membrane porosity are allowed to pass into the filtrate. Once in the filtrate channel, the processed fluid is directed to one of the filtrate ports and exits the cassette.

Figure 4:
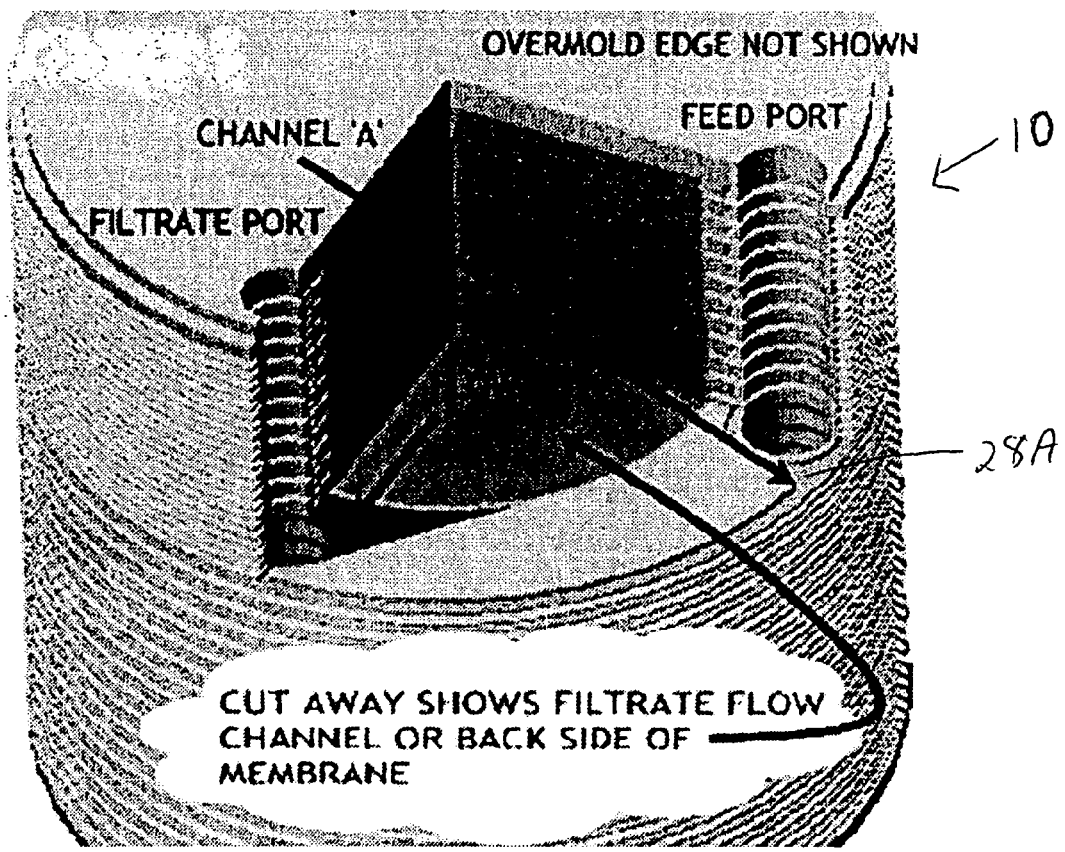
FIG. 4 is a perspective, cut-away schematic view of the preferred embodiment of the invention showing the filtrate flow channel or back side of the membrane.
Figure 5:
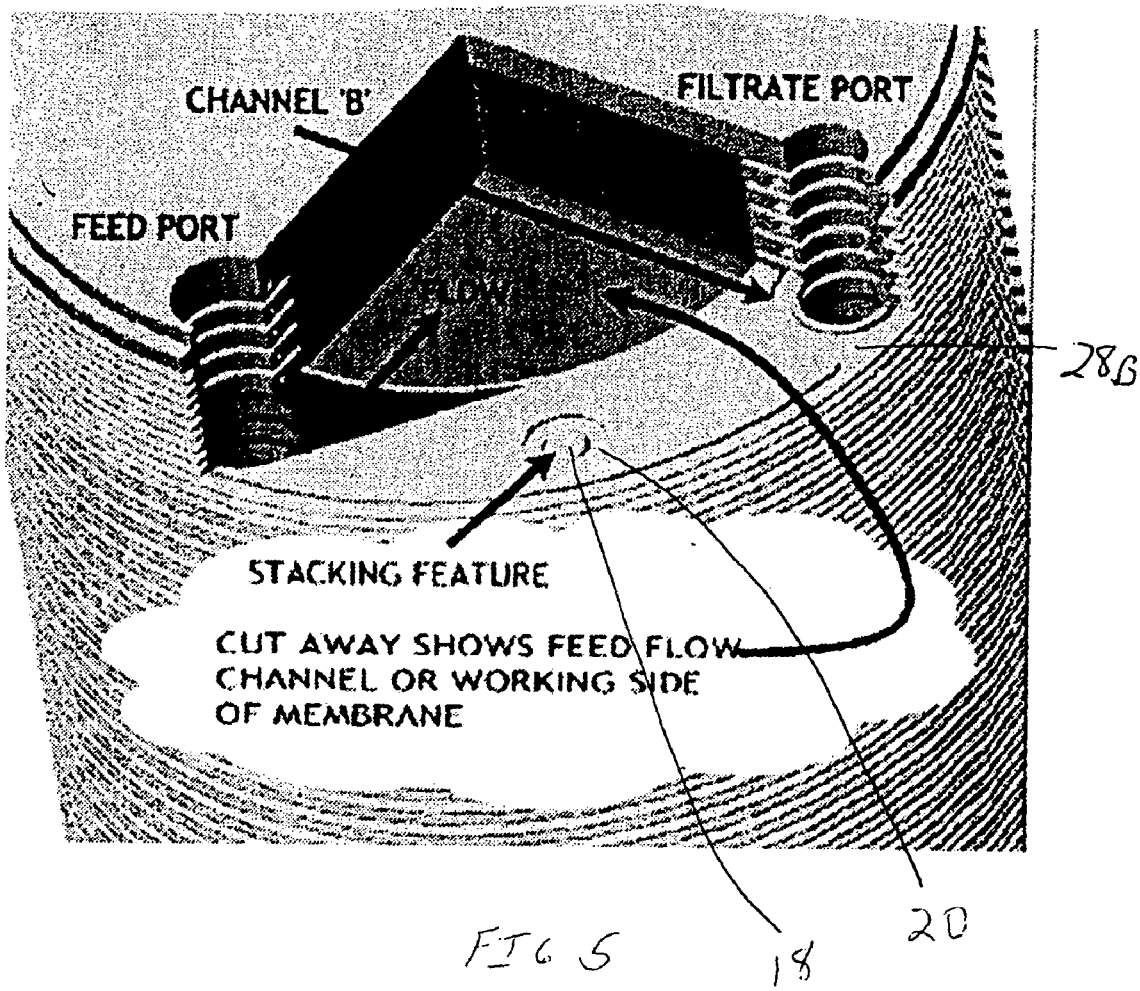
FIG. 5 is a perspective, cut-away schematic view of the preferred embodiment of the invention showing the feed flow channel or working side of the membrane and the stacking feature.

After the framed membranes are stacked to create cassette 10, cassette 10 is placed in a molding press and jacket 14 is injection molded around the cassette, filling in channels 28A and 28B as shown in FIGS. 4 and 5. The molding material of jacket 14 is also preferably polypropylene.

Although the preferred embodiment of cassette 10 is round, the cassette of the invention may take any suitable shape or geometry including, but not limited to, those shown in FIGS. 7-10. For example, rectangular shaped cassettes are suitable for use, or may otherwise be retrofitted for use, with currently available filtration devices such as the Pall Centrasette and Millipore Pelicon II.

Figure 7:
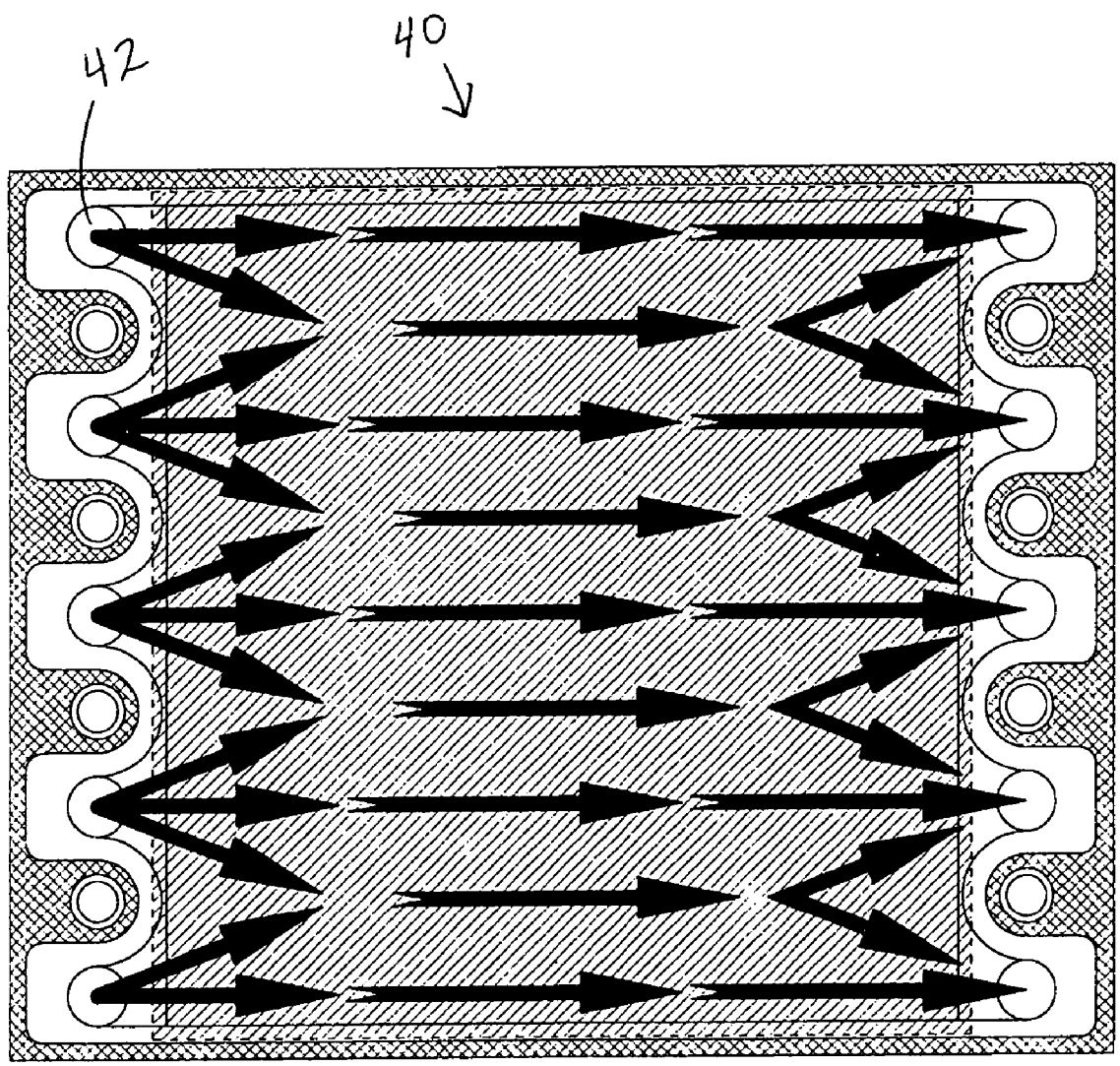
FIG. 7 is a schematic top view of the working surface of the membrane of the invention showing the direction of flow of the feed/retentate channel.
Figure 8:
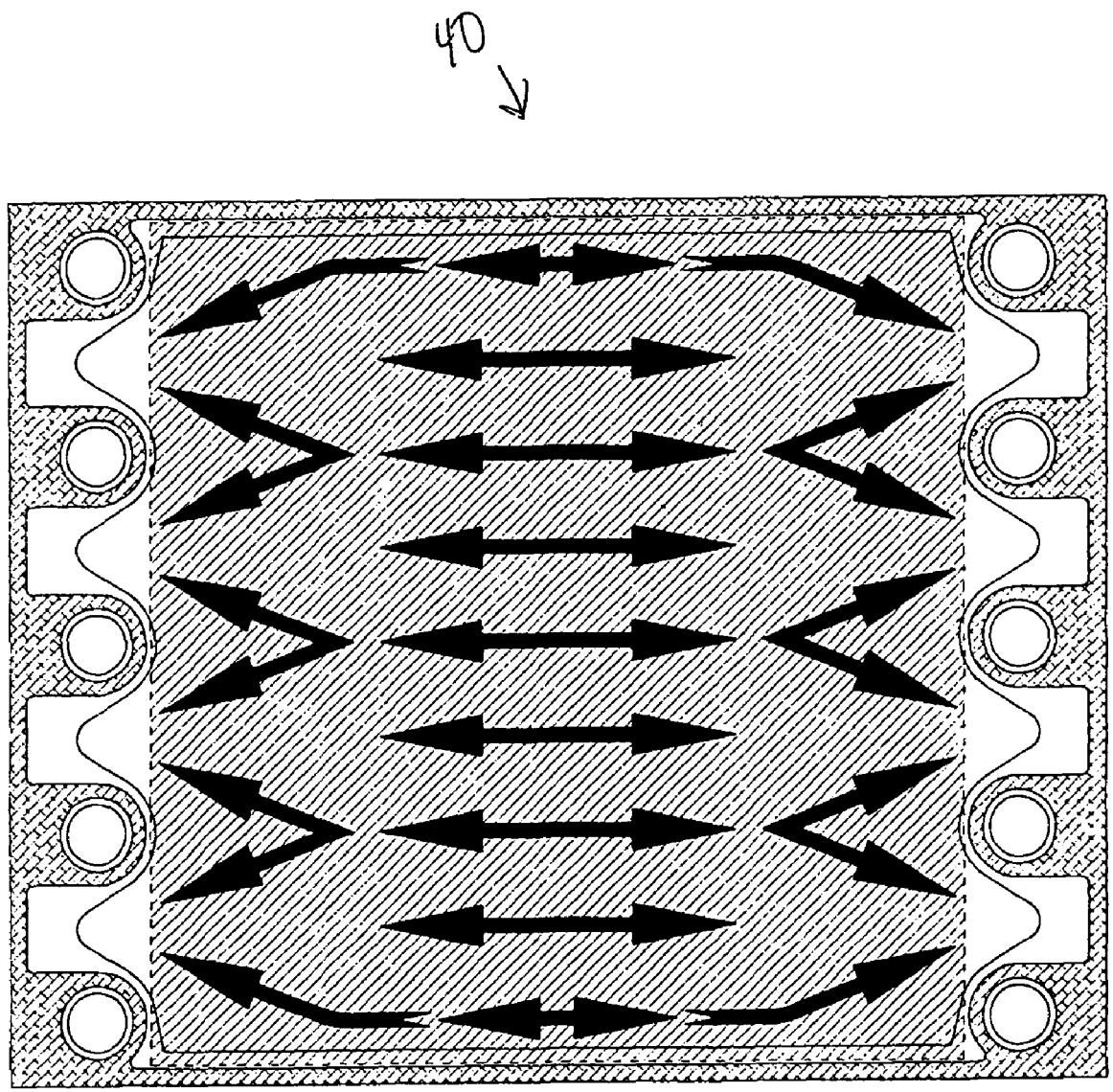
FIG. 8 is schematic bottom view of the membrane of the invention showing the direction of flow of the permeate or filtrate channel.

The working surface of framed membrane 40 of the invention is shown in FIG. 7, showing the direction of flow of the feed/retentate channel 42. FIG. 8 is a bottom view of framed membrane 40 of the invention showing the direction of flow of the permeate or filtrate channel.

Figure 9:
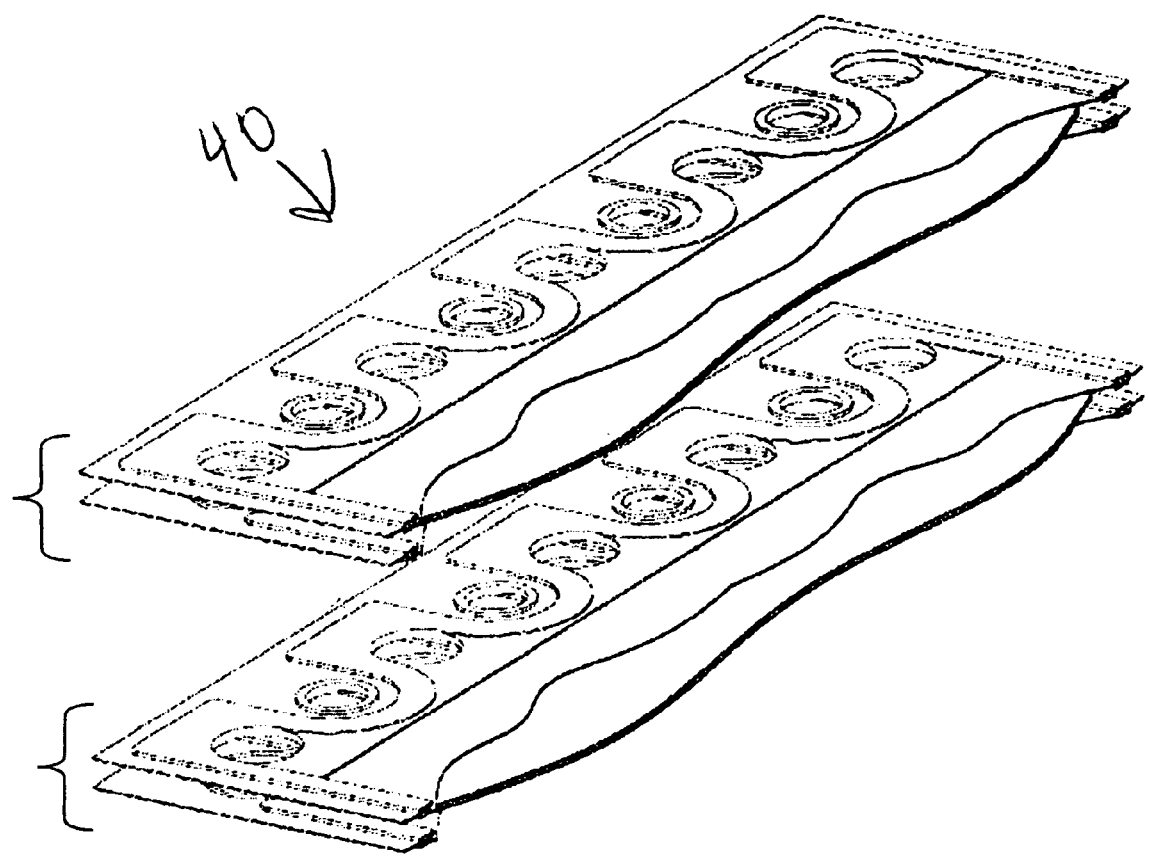
FIG. 9 is a partial, exploded, perspective view of two frames of the cassette of the invention, having a polygonal shape, aligned to form a permeate channel.
Figure 10:
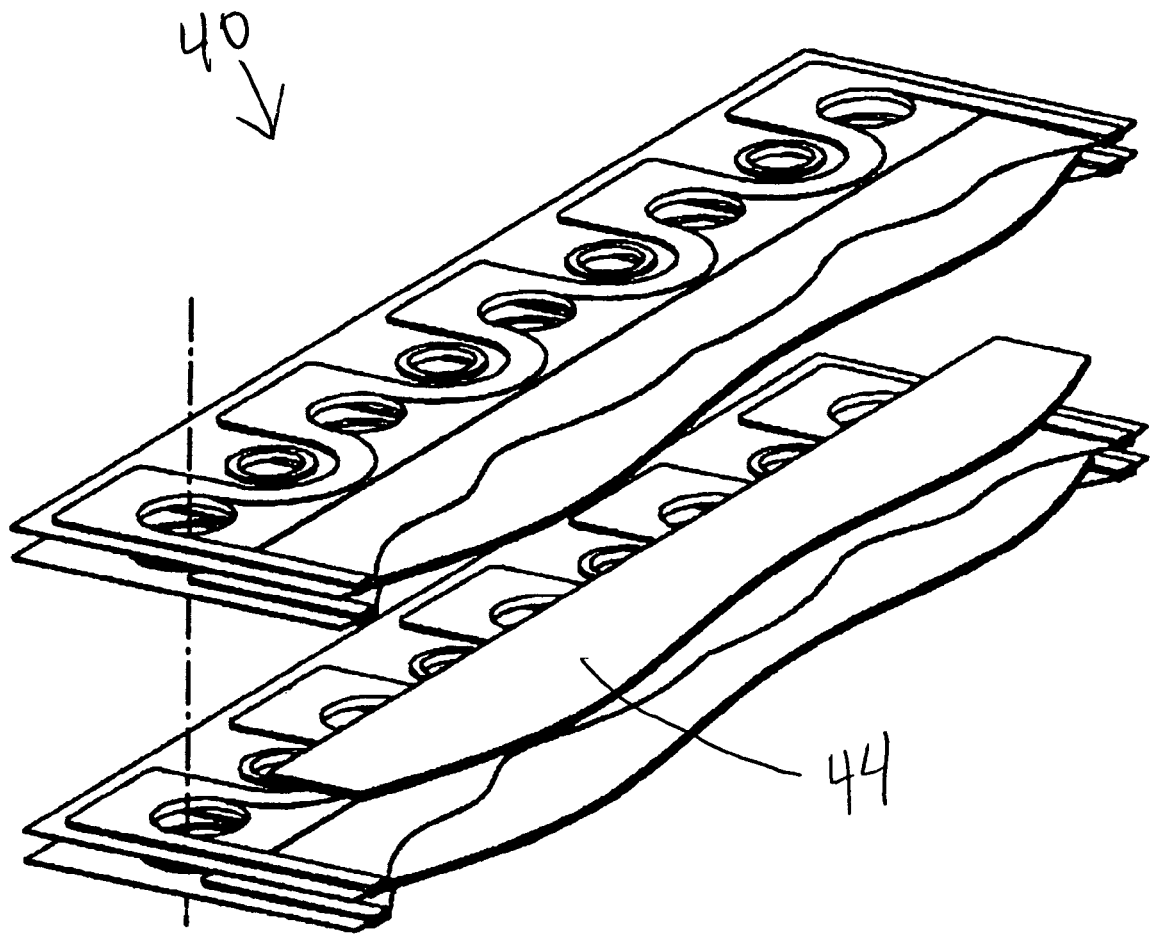
FIG. 10 is partial, exploded, perspective view of two frames of the cassette of the invention, having a polygonal shape, showing a screen positioned in the feed/retentate layer.

FIG. 9 illustrates how two framed membranes 40 of the cassette of the invention, having a polygonal shape, are aligned to form a permeate channel, while FIG. 10 shows two frames of the cassette of the invention, having a polygonal shape, with screen 44 positioned in the feed/retentate layer.

Cassette 10 is preferably molded using polypropylene for the frame and the jacket. If any shrinkage occurs for a particular application using polypropylene, other suitable plastic materials may be used, or the polypropylene may be enhanced with talc, mineral, fiberglass, or other suitable fillers. Other suitable molding materials include, but are not limited to, polysulfone.

Figure 14:
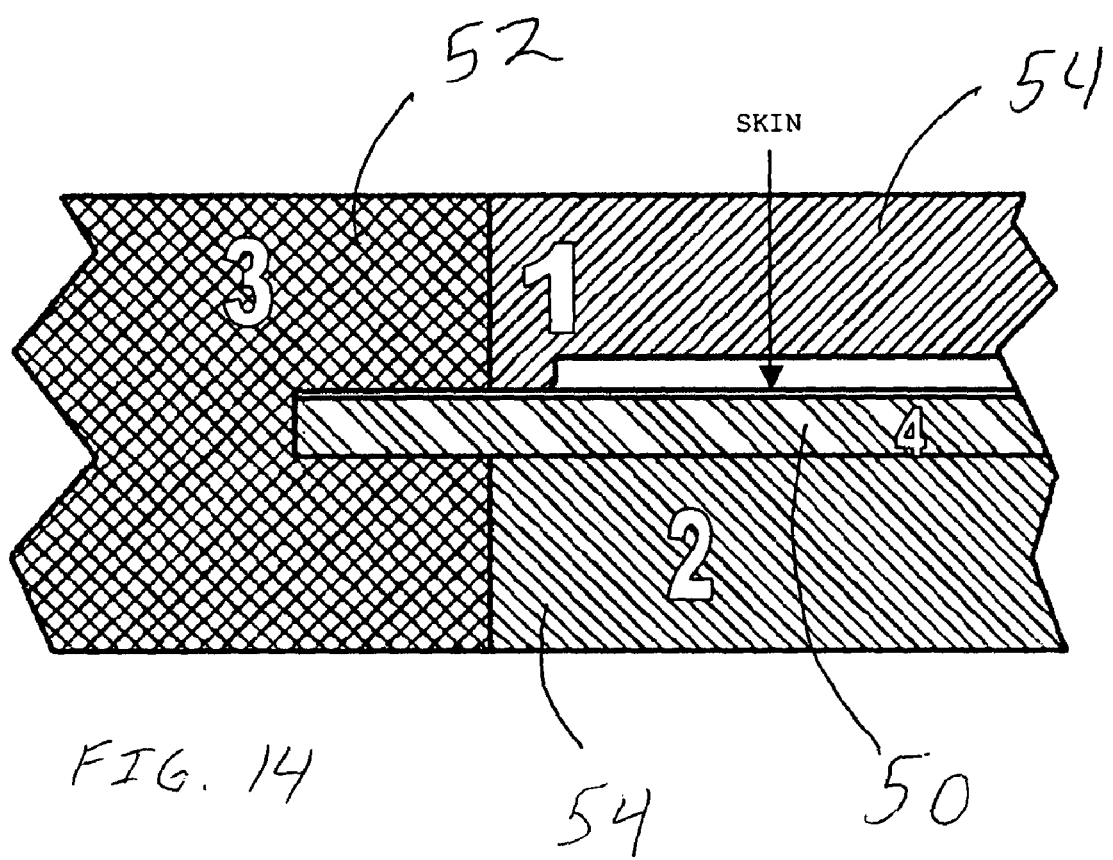
FIG. 14 is a partial, cross-sectional view of the molding tool used in the method of the invention shown after the overmolding is applied to the outside surface of the cassette.

When creating the tool or molding press, certain steps should be taken to protect the skinned membranes which are quite fragile. Care must be taken to ensure that the membrane is not damaged when the mold 54 is clamped down on the cassette to form a shut-off. For example, as shown in FIG. 14, the mold half 54 in contact with the membrane 50 skin should be relieved except for the outer perimeter where it will shut-off the plastic. The polypropylene material 52 or other plastic will encapsulate the section of membrane protruding from the mold.

As described above, the stacked, framed membranes are then over-molded with plastic. Therefore no other adhesives or membrane attachment methods are required. When using dissimilar materials for the membrane and frame, the overall structure is preferably a mechanical lock. This is preferred to ensure that there is no leak path between the frame and membrane. When using similar materials for the membrane and frame, the materials will cohesively bond and not require a mechanical locking feature.

Cassette 10 has a round geometry and therefore minimizes dead legs within the flow paths. A dead leg is defined as a zone within the flow path with a zero flow rate. A round geometry creates better sweeping action through the device. The shape of the cassette may be adapted to include alternative geometries to minimize dead legs by using generous radii at all internal corners to promote sweeping flow through the device.

As shown in FIGS. 4 and 5, channels 28A and 28B provide the mechanism by which the cassette is encapsulated and sealed in one step. Channels 28A and 28B allow the edge plastic to run in and around each port on each layer. This seals each layer and port from one another and bonds the entire assembly together.

Figure 11:
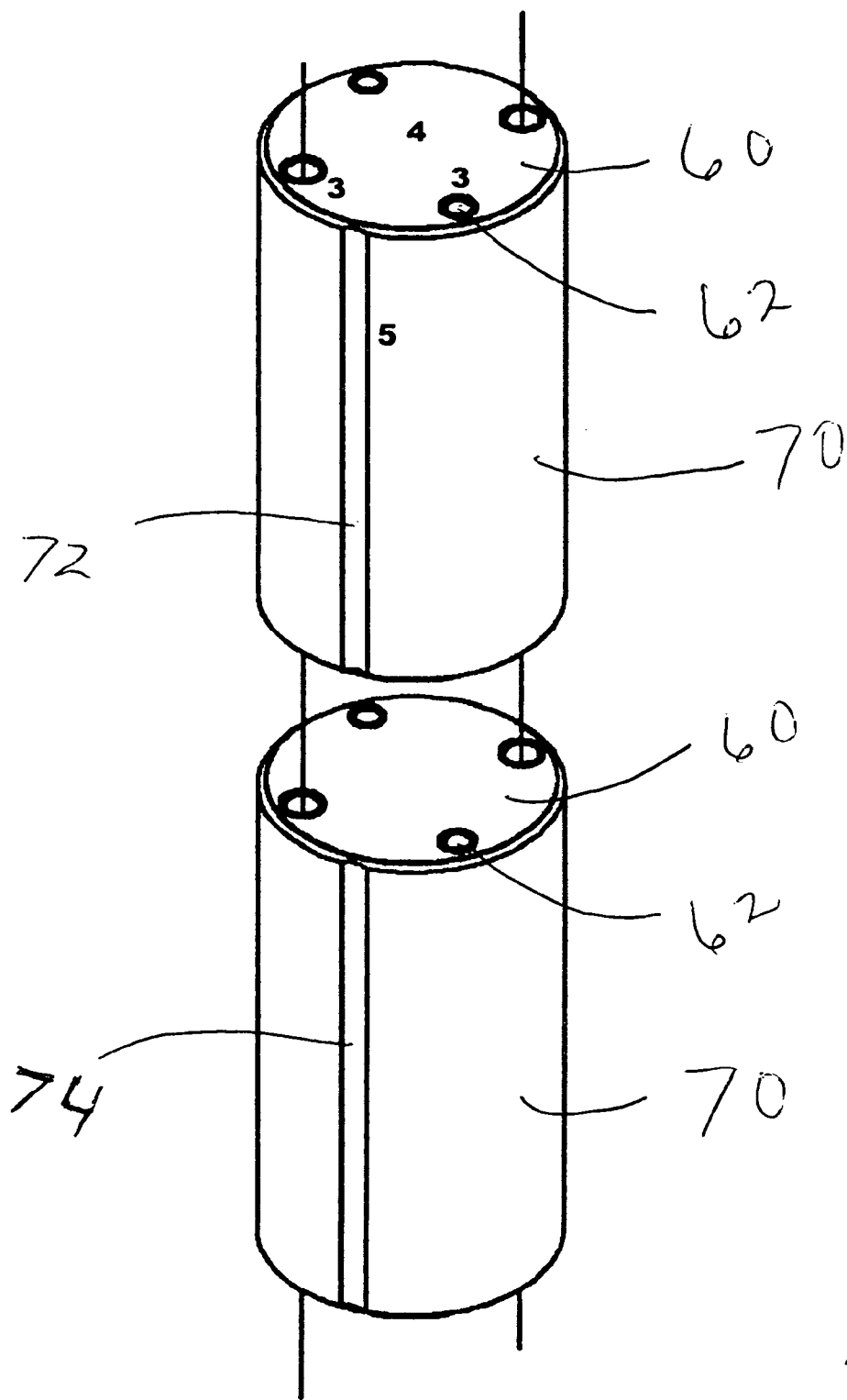
FIG. 11 is an exploded, perspective view of two cassettes of the invention stacked together with 0-rings molded to the cover plate and a stacking notch molded into the side of the cassette.
Figure 12:
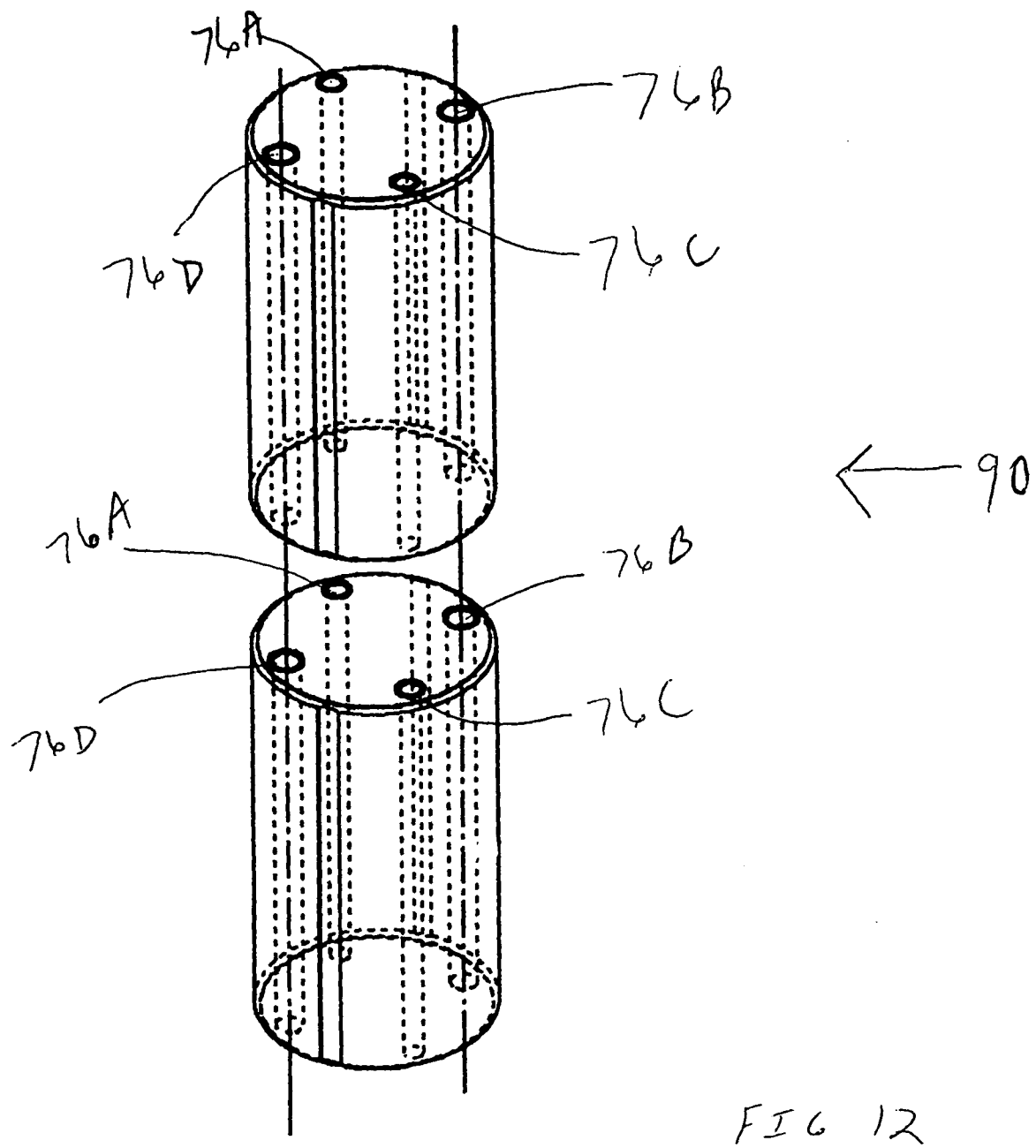
FIG. 12 shows the two cassettes shown in FIG. 11 with the conduits that connect the channels shown in phantom.
Figure 13:
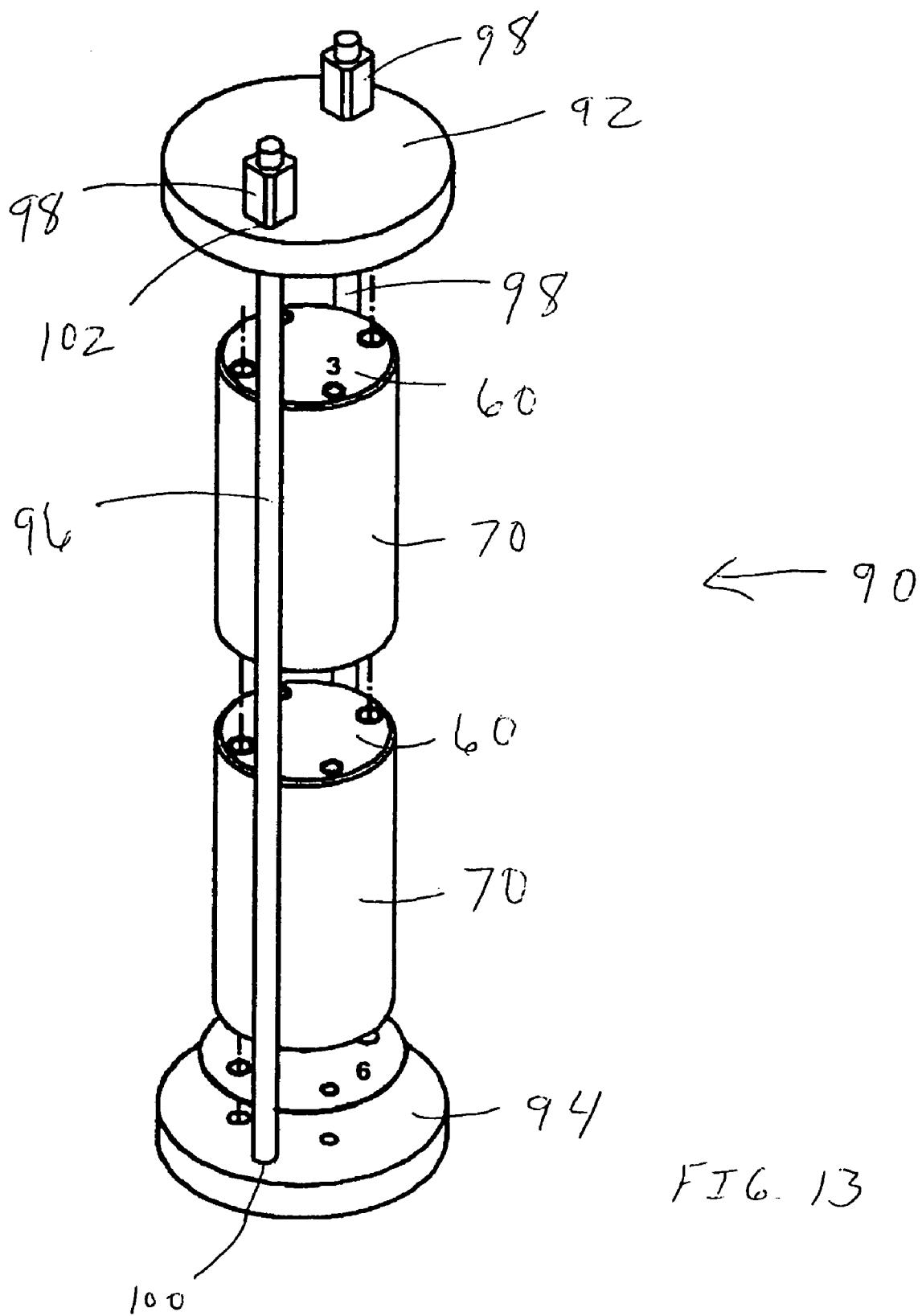
FIG. 13 is an exploded, perspective view of two cassettes of the invention stacked in a filter housing and clamped between two pressure plates.

Cover plates 60, shown in FIGS. 11-13, preferably comprise a gasket so that the cassettes may be stacked in series without leaking. The gasket can also be over-molded with a thermoplastic elastomer to reduce the amount of compression required to eliminate any leak path.

The cassettes of the invention are particularly suited for stacking in a series to form filtration device 90 as shown in FIGS. 11-13. As shown in FIG. 11, two cassettes 72 and 74 are stacked on top of each other with o-rings or gaskets 62 molded to the cover plates 60. Vertical grooves, or notches, 72 and 74 are molded into the sides of the cassettes. When the cassettes are stacked, each of the ports of each of the cassettes must be lined up with the corresponding port of the adjacent cassette to form conduit 76A, 76B, 76C, and 76D through the stack of cassettes. Similarly, grooves 72 and 74 should also line up when the cassettes are stacked to form a continuous vertical groove on the outside surface of device 90.

As shown in FIG. 13, filtration device 90 comprises two cassettes 70 stacked one on top of each other, each with cover plate 60, a top pressure plate 92 and a bottom pressure plate 94 between which the cassettes are held in placed and compressed. Dowels 96 preferably have a stop member at the bottom that keeps the dowel from passing through bottom plate 94. Dowels 96 are passed through bores 100 of the bottom plate, seated in grooves 72, and passed through bores 102 in the top plate. A threaded member, such as threaded nut 98, is then tightened down on the threaded end of dowel 96 to compress the entire device 90, including the cassettes.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A filtration cassette comprising:
 a plurality of porous membranes, each membrane having a front side, a back side and a perimeter;
 each membrane further having an over-molded non-porous thermoplastic frame that individually encapsulates said membrane around the entirety of said perimeter, wherein said over-molded non-porous frame has
  a plurality of openings that define at least one retentate port, at least one feed port and at least one filtrate port, and
  flow channel means proximate a perimeter of said frame for providing a mechanism by which the cassette is encapsulated and sealed in one step and allows plastic to run in and around each port on each layer thereby sealing each layer and port from one another and bonding the entire assembly together; and comprising an over-molded thermoplastic encapsulating jacket that penetrates said flow channel to seal said plurality of membranes.

2. The cassette of claim 1, wherein said non-porous frame further comprises at least one stacking member.

3. The cassette of claim 2, wherein at least one of said stacking members comprises an opening through said frame and at least one of said stacking members comprises a detent.

4. The cassette of claim 1, further comprising a top subassembly with an upper surface and a cover plate on said upper surface.

5. The cassette of claim 1, wherein said jacket further comprises a stacking notch.

6. The cassette of claim 1, wherein said frame comprises polypropylene.

7. The cassette of claim 6, wherein said frame and said jacket comprise polypropylene.

8. The cassette of claim 1, wherein said framed membranes are stacked adjacent to each other so that said retentate port and filtrate port of each said membrane connects to said retentate port and filtrate port, respectively, of an adjacent membrane, to form at least one retentate conduit and one filtrate conduit through said stacked membranes.

9. The cassette of claim 1, further comprising one or more screens between two or more of said membranes.

10. A method for making a filtration cassette, comprising the steps of,
providing a plurality of porous membranes, each membrane having a front side, a back side and a perimeter;
individually framing each of said membranes by injection molding one or more plastic materials around said perimeter of said membrane, thereby forming at least one retentate port, at least one feed port, at least one filtrate port, a flow channel proximate a perimeter of said frame, and one or more means for stacking;
stacking a plurality of said framed membranes, adjacent to one another, so that said retentate ports and said filtrate ports of each frame members line up, respectively to an adjacent framed member, to form a retentate conduit and a filtrate conduit through said stack of framed members; and
injection molding a plastic jacket around said stack of framed members so that said jacket penetrates said flow channels of said frames to seal said stacked membranes.

11. The method of claim 10, wherein said stacking step further comprising stacking one or more screens between two or more of said subassemblies.

12. The method of claim 10, wherein said plastic frame material comprises polypropylene.

13. The method of claim 12, wherein said plastic jacket comprises polypropylene.

14. A filtration device comprising,
a plurality of stacked filtration cassettes comprising,
a plurality of stacked subassemblies, wherein at least one of said subassemblies comprises,
a porous member having a front side and a back side and a perimeter, and
an overmolded frame that individually encapsulates a membrane around the entire perimeter of said front side and said back side of said membrane; wherein said overmolded frame has at least one retentate port, at least one feed port, at least one filtrate port, and a flow channel proximate a perimeter of said frame, and
a cassette housing comprising,
a first pressure plate on the top of said stacked cassettes,
a second pressure plate on the bottom of said stacked cassettes,
a gasket between each of said pressure plates and their respective adjacent cassette,
a means for securing said stacked cassettes between said pressure plates, and
a means for compressing plates and cassettes together.

15. The device of claim 14, wherein said plates each have at least two bores through said plates and said means for securing comprises two dowels, each extending between said plates and through a bore in each of said plates and having threads a first end of said dowel and a stop member on said second end of said dowel, and wherein said means for compressing comprises a correspondingly threaded end cap tightened down onto said threaded first end of said dowel.

16. A filtration device comprising,
a plurality of stacked filtration cassettes comprising,
a plurality of stacked subassemblies, wherein at least one of said subassemblies comprises,
a porous member having a front side and a back side and a perimeter, and
an overmolded frame that individually encapsulates a membrane around the entire perimeter of said front side and said back side of said membrane; wherein said overmolded frame has at least one retentate port, at least one feed port, at least one filtrate port, and a flow channel proximate a perimeter of said frame, and
a cassette housing comprising,
a first pressure plate on the top of said stacked cassettes,
a second pressure plate on the bottom of said stacked cassettes,
a gasket between each of said pressure plates and their respective adjacent cassette,
a means for securing said stacked cassettes between said pressure plates, and
a means for compressing plates and cassettes together,
wherein said plates each have at least two bores through said plates and said means for securing comprises two dowels, each extending between said plates and through a bore in each of said plates and having threads a first end of said dowel and a stop member on said second end of said dowel, and wherein said means for compressing comprises a correspondingly threaded end cap tightened down onto said threaded first end of said dowel,
wherein said means for securing further comprises a vertical groove, corresponding to each of said dowels, provided in said jacket of said cassettes that, when said cassettes are stacked, lineup with the groove on each adjacent cassette to form a combined groove into which at least a portion of said dowels is seated.

17. The filtration device of claim 16, wherein the frame comprises of polypropylene.

18. A filtration device comprising,
a first and second membrane, each having a front side, a back side and a perimeter;
the first membrane having a non-porous thermoplastic frame that individually encapsulates the first membrane around the entire perimeter, the frame of the first membrane having a plurality of openings defining at least one retentate port, at least one feed port and at least one filtrate port, the frame of the first membrane further having a recess defining a flow path from the feed port to the retentate port;
the second membrane having a non-porous frame that individually encapsulates the second membrane around the perimeter, the frame of the second membrane having a plurality of openings defining at least one retentate port, at least one feed port and at least one filtrate port, the frame of the second membrane further having a recess defining a flow path from the back side of the membrane to the filtrate port; and
an encapsulating jacket that seals the first and second membranes.

19. The filtration device of claim 18, wherein the non-porous frame of at least the first membrane is over-molded.

20. The filtration device of claim 19, wherein the non-porous frame of at least the first membrane comprises a stacking element.

21. The filtration device of claim 18, wherein the non-porous frame of at least the first membrane comprises a flow channel around at least one of the openings, and the encapsulating jacket penetrates the flow channel.

22. A filtration device comprising,
 a plurality of porous membranes having a front side, a back side and a perimeter;
 a plurality of non-porous thermoplastic frames, each frame encapsulating the entire perimeter of a membrane, each frame having openings defining at least one retentate port, at least one feed port and at least one filtrate port, and each frame having a peripheral recess defining a flow channel; and
 an encapsulating jacket that penetrates the flow channels to seal the plurality of porous membranes.

23. The filtration device of claim 22, wherein the flow channel of each non-porous thermoplastic frame surrounds at least one of the openings.

24. The filtration device of claim 22, wherein the non-porous thermoplastic frames are over-molded.

25. The filtration device of claim 22, wherein at least one of the non-porous thermoplastic frames comprises a stacking element.

* * * * *